United States Patent [19]

Reif et al.

[11] Patent Number: 4,725,404
[45] Date of Patent: Feb. 16, 1988

[54] LEAD CALCIUM ALLOY AND PROCESS OF MAKING SAME

[75] Inventors: Winfried Reif, Berlin; Magdy Abdel-Reihim, Büdingen; Andreas Schuler, Berlin, all of Fed. Rep. of Germany

[73] Assignee: Accumulatorenfabrik Sonnenschein GmbH, Fed. Rep. of Germany

[21] Appl. No.: 872,873

[22] Filed: Jun. 11, 1986

[30] Foreign Application Priority Data

Jun. 20, 1985 [DE] Fed. Rep. of Germany ....... 3522033

[51] Int. Cl.⁴ .............................................. C22C 11/02
[52] U.S. Cl. .................................... 420/565; 420/564; 429/245
[58] Field of Search ................. 420/564, 565; 429/245

[56] References Cited

U.S. PATENT DOCUMENTS 4,159,908  7/1979  Rao et al. ........................... 420/565

FOREIGN PATENT DOCUMENTS 2452842  5/1976  Fed. Rep. of Germany .
3045683  6/1982  Fed. Rep. of Germany .
3131510  10/1982  Fed. Rep. of Germany .
3203138  3/1983  Fed. Rep. of Germany .
46124  4/1979  Japan ................................... 420/565

Primary Examiner—L. DeWayne Rutledge
Assistant Examiner—Robert L. McDowell
Attorney, Agent, or Firm—Shlesinger, Fitzsimmons & Shlesinger

[57] ABSTRACT

The invention is directed to a lead calcium alloy for electrode grids, the alloy being substantially antimony-free. Copper and/or sulphur in small amounts are added to said alloy in order to significantly improve the casting properties, the mechanical and the corrosion properties.

9 Claims, 2 Drawing Figures

LEAD CALCIUM ALLOY AND PROCESS OF MAKING SAME

The invention is directed to a lead calcium alloy and a process of making the same.

Recently, lead calcium alloys and lead calcium tin alloys have been frequently used for making electrode grids, because such alloys exhibit more favourable gassing behaviour and thus show reduced self-discharge and reduced water consumption during operation of modern minimum-maintenance or maintenance-free storage batteries as compared with lead antimony alloys mainly used so far.

Lead calcium alloys have a low but nevertheless sufficient mechanical strength for the subsequent processing of the grids as compared to lead calcium tin alloys.

Such alloys exhibit a certain grain structure which is characterized by columnar grains with discontinuous precipitates of lead calcium tin compounds at the grain boundaries. This structure has a detrimental effect on the casting properties, the mechanical and corrosion properties of the alloys.

The DE-PS No. 3,313,510 discloses a low-antimony—but not antimony-free—lead alloy for electrode grids, in which apart from beryllium also the addition of grain refining agents such as copper and sulphur is mentioned.

The DE-PS No. 3,203,138 likewise discloses an electrode grid for lead-acid storage batteries, wherein mainly beryllium has been added so as to obtain especially fine grains.

Further refinement is to be obtained by combination of the beryllium with copper, silver, oxygen, sulphur, tellurium, phosphorus, arsenic or carbon. The patent provides for a so-called hold-up time ranging between a few to 20 minutes, i.e. the time during which the alloy should be cast to obtain lead grids.

The DE-OS No. 3,045,683 discloses a lead calcium alloy for making electrode grids, wherein a certain percentage of calcium, bismuth, silver has been added. Moreover, the addition of tin and/or aluminium has been provided.

Finally, the DE-OS No. 2,452,842 provides a lead alloy which contains copper and tin.

It is the object of the invention to improve an alloy in accordance with the preamble of claim 1 in such a way that the casting properties, the mechanical and corrosion properties are significantly improved.

Surprisingly, it has been found that a small amount of sulphur and/or copper added to such a lead calcium alloy or a lead calcium tin alloy significantly improves the aforementioned three parameters. Previously, it was merely known to add copper and sulphur in predetermined proportions and to predetermined alloys (which, however, always contain antimony) for the purpose of grain refinement.

Detailed studies have revealed that the aforementioned additions clearly change the grain structure of the alloy. In place of the columnar grains with discontinuous precipitates at the grain boundaries, a globularly solidified alloy having quite different properties was formed, in which the precipitates at the grain boundaries are more regularly distributed, a feature which is particularly advantageous in respect of the corrosion behaviour.

An embodiment of the invention will be explained below.

Example:

500 kg of a melt of a technical alloy PbCa 0.08 Sn 1 are heated to 500° C. Thereupon 0.02 m% of copper and 0.02 m% of sulphur are successively introduced into the melt by means of a bell. Then the melt is stirred with an iron rod. Subsequently, during a period ranging between a few minutes up to a maximum of 15 hours the melt can be cast to electrode grids in corresponding temperature-resistant moulds without the occurrence of any change in the grain structure. The mould temperature, which may initially be room temperature, may rise up to 300° C. during casting.

Figure 1:
FIG. 1 is a photomicrograph enlarged 20 times, and illustrating the grain structure of a prior art lead/calcium/tin alloy, which exhibits the usual columnar grain growth.

FIG. 1 illustrates the grain structure of a PbCa 0.08-Sn 1 alloy without additives in accordance with the prior art. The columnar solidification morphology is clearly apparent.

Figure 2:
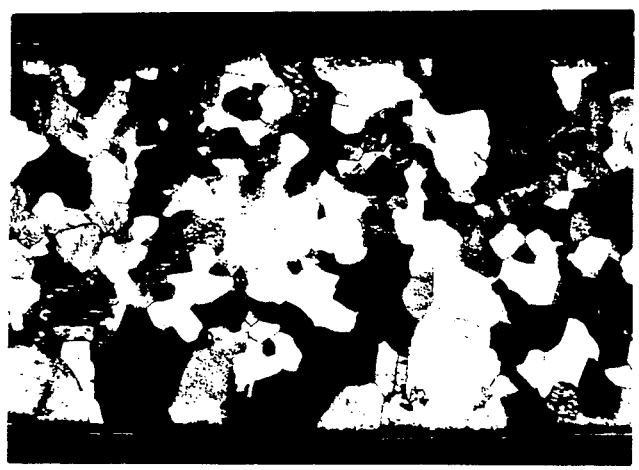
FIG. 2 is a photomicrograph enlarged 20 times, and illustrating the grain structure produced in a lead/calcium alloy made according to the present invention.

FIG. 2 illustrates the grain structure of a PbCa 0.08 Sn 1 alloy to which 0.02 m% of copper and 0.02 m% of sulfur were added and which was prepared in accordance with the process explained in the example. Here, a distinct globular structure is apparent.

It is to be understood that the above-described example constitutes a lead/calcium alloy which is substantially free of any antimony, as distinguished, for example, from the above-noted German publication DE-PS No. 3,313,510, which in fact is designed to contain antimony, at least more than the trace amount, and therefore in fact is not substantially antimony-free. The surprising results referred to above have occurred by producing a substantially antimony-free lead/calcium alloy containing calcium in a range of from 0.005 to 1.0% together with sulphur in a range of between 0.0005 and 5%, but preferably between 0.001 and 0.5%, and/or copper ranging from 0.0005 to 5%, but preferably from 0.001 to 0.5%. When adding both copper and sulphur to the alloy, a copper/sulphur compound, preferably $Cu_2S$ may be added in the range from 0.0005 to 5%, and preferably from 0.001 to 0.5%. Also, in accordance with the teachings of this invention, tin may be added to the alloy in the amount ranging from 0.01 to 5.0%.

What is claimed is:

1. A substantially antimony-free lead calcium alloy for electrode grids, said alloy consisting essentially of a calcium content ranging from 0.005 to 1.0%, sulphur (S) in an amount between 0.0005 and 5%, and the balance being lead, said alloy having a substantially globular grain structure.

2. An alloy as claimed in claim 1, characterized in that sulphur is present in a range of from 0.001 to 0.5%.

3. An alloy as claimed in claim 1 or claim 2, characterized in that copper is present in a range of from 0.0005 to 5%.

4. An alloy as claimed in claim 1 or 2, characterized in that copper is present in a range of from 0.001 to 0.5%.

5. An alloy as claimed in claim 1, characterized in that tin (Sn) is present in an amount ranging from 0.01 to 5.0%.

6. A process for making the allow as claimed in claim 3, characterized by:

heating a lead calcium alloy in a heat-resistant vessel to a temperature ranging from 300° C. to 600° C., subsequently introducing into the resulting melt the proportion of sulphur or respectively, sulfur and copper, mixing the newly introduced constituents with the melt, and casting the blended melt to form electrode grids within a period ranging from 5 minutes to 15 hours, wherein the grain structure is not changed, and the temperature of the mold may rise from room temperature up to 350° C.

7. A process as claimed in claim 6, characterized in that sulphur or, respectively, sulfur and copper, are added to the melt by means of a bell.

8. A process as claimed in claim 6, wherein the proportion of sulfur or, respectively, sulfur and copper, is added as an elementary constituent.

9. A process as claimed in claim 6, wherein the proportion of sulfur and copper are added in the form of $Cu_2S$ in the range of from 0.0005 to 5%.

* * * * *